United States Patent
Suwa et al.

(10) Patent No.: US 9,512,851 B2
(45) Date of Patent: Dec. 6, 2016

(54) ELECTRONIC APPARATUS WITH FAN MOTOR

(71) Applicant: FANUC Corporation, Minamitsuru-gun, Yamanashi (JP)

(72) Inventors: Hiroyuki Suwa, Minamitsuru-gun (JP); Shingo Odauchi, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 46 days.

(21) Appl. No.: 14/612,421

(22) Filed: Feb. 3, 2015

(65) Prior Publication Data

US 2015/0219109 A1     Aug. 6, 2015

(30) Foreign Application Priority Data

Feb. 4, 2014   (JP) .................................. 2014-019512

(51) Int. Cl.
 *F04D 27/00* (2006.01)
 *F04D 19/00* (2006.01)
 *H02P 1/02* (2006.01)

(52) U.S. Cl.
 CPC ........... *F04D 27/001* (2013.01); *F04D 19/002* (2013.01); *H02P 1/029* (2013.01)

(58) Field of Classification Search
 CPC .................................. F04D 27/00; F04D 19/00
 USPC .................................................. 318/431, 430
 See application file for complete search history.

(56) References Cited

U.S. PATENT DOCUMENTS

| | | | | |
|---|---|---|---|---|
| 5,727,470 A | * | 3/1998 | Kurzer | B41F 35/00 101/423 |
| 7,305,316 B2 | * | 12/2007 | Frankel | H05K 7/20209 318/471 |
| 2004/0018079 A1 | * | 1/2004 | Miller | F04D 27/008 415/1 |
| 2008/0310967 A1 | * | 12/2008 | Franz | F04D 27/004 417/32 |
| 2010/0111134 A1 | * | 5/2010 | Matsumoto | H02M 1/32 374/43 |
| 2010/0178044 A1 | * | 7/2010 | Ohno | G03B 5/00 396/55 |
| 2010/0226792 A1 | * | 9/2010 | Sato | F04D 25/166 417/1 |

FOREIGN PATENT DOCUMENTS

| | | |
|---|---|---|
| EP | 2518893 A1 | 10/2012 |
| JP | S62-281781 A | 12/1987 |
| JP | 04139310 A * | 5/1992 |

(Continued)

OTHER PUBLICATIONS

Decision to Grant a Patent dated Jun. 9, 2015, along with its English-language translation, in corresponding Japanese Patent Application 2014-019512.

*Primary Examiner* — Kawing Chan

(74) *Attorney, Agent, or Firm* — Drinker Biddle & Reath LLP

(57) ABSTRACT

If a fan motor in a stopped state remains stopped even when it is powered on, restart processing of the fan motor is carried out by rotating the fan motor forward and backward. If the fan motor rotates as a result of the restart processing, an indication to prompt replacement of it is displayed. If the fan motor remains stopped without rotating, in contrast, it is determined to be defective, and an electronic apparatus is stopped.

8 Claims, 3 Drawing Sheets

(56) References Cited

FOREIGN PATENT DOCUMENTS

| | | | |
|---|---|---|---|
| JP | S63-224696 | A | 9/1998 |
| JP | 2001-298989 | A | 10/2001 |
| JP | 2002-101570 | A | 4/2002 |
| JP | 2005-137069 | A | 5/2005 |
| JP | 2006-115641 | A | 4/2006 |
| JP | 2007-139202 | A | 6/2007 |
| JP | 2009180391 | A * | 8/2009 |
| JP | 2010-136609 | A | 6/2010 |
| JP | 2011-152032 | A | 8/2011 |
| JP | 2013-013257 | | 1/2013 |

* cited by examiner

ELECTRONIC APPARATUS WITH FAN MOTOR

RELATED APPLICATION DATA

This application claims priority under 35 U.S.C. §119 and/or §365 to Japanese Application No. 2014-019512 filed Feb. 4, 2014, the entire contents is incorporated herein by reference.

BACKGROUND OF THE INVENTION

Field of the Invention

The present invention relates to an electronic apparatus with a fan motor.

Description of the Related Art

A numerical controller used for the control of a machine tool or the like generates heat during use and may sometimes malfunction. To prevent this, in general, the housing of an electronic apparatus that comprises the numerical controller is provided with vent holes, and a fan motor is mounted in the vicinity of these vent holes such that it ventilates the interior of the housing to cool the numerical controller.

In some cases, the operation of the fan motor may fluctuate due to service life expiration of a built-in bearing, clogging by contamination, etc. If the fan motor thus varied in operation continues to be operated, it sometimes cannot perform appropriate cooling. If the operation of the motor is further continued, it may possibly hinder the operation of the numerical controller.

To overcome this, the service life of the fan motor is detected in advance. Characteristic fluctuations occur due to increase in mechanical rotational load caused by bearing wear during prolonged operation, clogging by contamination, etc. Thus, the life expectancy of the fan motor is detected by detecting these characteristic fluctuations.

Japanese Patent Application Laid-Open No. 2010-136609 discloses a technique to determine whether or not the cooling capacity of an inverter device is reduced, based on the result of comparison between the value of a thermal time constant calculated by a thermal time constant calculating circuit and a reference value of the thermal time constant stored beforehand in a memory, in order to measure a reduction in the cooling capacity due to service life expiration of a cooling fan, clogging, etc.

Japanese Patent Application Laid-Open No. 2007-139202 discloses a technique in which a controller for a water heater detects an abnormality of a component of the water heater, stops the operation of the component of which abnormality is detected and restarts the operation of the component, and determines that the component is out of order if the number of restarts of the operation of the component reaches a predetermined value.

Japanese Patent Application Laid-Open No. 2002-101570 discloses a technique in which a power supply section or uninterruptible power supply unit of an electronic apparatus is provided with a detection function to determine the life expectancy and operation state of a fan motor and notify the main body of the electronic apparatus of the determined conditions.

Japanese Patent Application Laid-Open No. 2001-298989 discloses a technique to determine whether or not the end of the service life of a DC fan motor of a vending machine is approached, based on the relationship between the actual speed of the DC fan motor and a reference rotational speed.

In the techniques disclosed in the four patent documents described above, the determination is made based on the result of comparison of the thermal time constant, fan speed, commercial power supply input, and DC fan motor speed with reference values. However, these techniques are characterized in that characteristic fluctuations during operation are detected.

FIG. 6 is a flowchart showing a flow of processing for the determination of the state of a prior art fan motor. The following is a sequential description of steps of the processing shown in this flowchart.

(Step SA1) The electronic apparatus is powered on.

(Step SA2) The fan motor is rotated.

(Step SA3) The state of the fan motor in rotation is determined. If the fan motor is rotating normally, the processing proceeds to Step SA4. If the motor is not rotating, that is, if it is defective, the processing proceeds to Step SA5. If the motor is rotating at a low speed, that is, if its performance is deteriorated, the processing proceeds to Step SA6.

(Step SA4) The operation of the electronic apparatus is continued and the processing returns to Step SA3.

(Step SA5) The fan motor is determined to be defective and the operation of the electronic apparatus is stopped.

(Step SA6) While the operation of the electronic apparatus is continued, an indication to prompt replacement of the fan motor is displayed due to the occurrence of deterioration.

(Step SA7) The state of the fan motor is determined. A criterion for this determination may be the same as or different from that for the determination in Step SA3. If the fan motor is rotating normally or at a low speed (that is, if the motor performance is deteriorated), the processing proceeds to Step SA6. If the motor is not rotating (that is, if the motor is defective), the processing proceeds to Step SA8.

(Step SA8) The fan motor is determined to be defective and the operation of the electronic apparatus is stopped.

The fan motor may be operated continuously or intermittently (repeating operation and stop). Such intermittent operation involves a stop period. If the operation is restarted after a stop, therefore, the coefficient of friction becomes higher than in continuous operation, the viscosity of bearing grease is increased by a temperature reduction due to the stop of operation, or contaminants are solidified. In some cases, therefore, the mechanical rotational load may become higher than in continuous operation. Thus, start failure may occur before characteristic fluctuations are detected.

SUMMARY OF THE INVENTION

Accordingly, the object of the present invention is to provide an electronic apparatus with a fan motor, configured so that the deterioration of the fan motor can be detected before the motor fails to start.

An electronic apparatus according to the present invention comprises a fan motor, a rotation state detection unit configured to detect a rotation state of the fan motor, a display unit configured to display an operation state of the fan motor, and a restart control unit configured to restart the fan motor if a rotation failure of the fan motor in a stopped state is detected. The display unit is configured to display an indication to prompt replacement of the fan motor if a normal operation of the fan motor is detected by the rotation state detection unit when the fan motor is restarted by the restart control unit. The electronic apparatus is stopped or the fan motor is de-energized if an abnormal operation of the fan motor is detected by the rotation state detection unit when the fan motor is restarted by the restart control unit.

The fan motor may comprise therein the rotation state detection unit and the restart control unit.

The display unit may be configured to display an indication to the effect that the fan motor is defective if an abnormal operation of the fan motor is detected by the rotation state detection unit when the fan motor is restarted by the restart control unit.

The restart control unit may be configured to operate the fan motor in a behavior different from that for the case of normal start when the fan motor is restarted.

The fan motor may be a reversible motor configured to repeat forward and backward rotations when restarted by the restart control unit, the electronic apparatus may further comprise a deterioration level determination unit configured to determine a deterioration level based on the frequency of forward and backward rotations of the fan motor, and the display unit may be configured to display a message corresponding to the deterioration level determined by the deterioration level determination unit.

The fan motor may be configured so that the torque thereof is variable whereby the torque is increased when the fan motor is restarted by the restart control unit, the electronic apparatus may further comprise a deterioration level determination unit configured to determine a deterioration level based on the value of torque obtained when the fan motor is restarted or the time required for the restart, and the display unit may displays a message corresponding to the deterioration level determined by the deterioration level determination unit.

According to the present invention, there can be provided an electronic apparatus with a fan motor, configured so that the deterioration of the fan motor can be detected before the motor fails to start.

BRIEF DESCRIPTION OF THE DRAWINGS

The above and other objects and features of the present invention will be obvious from the ensuing description of embodiments with reference to the accompanying drawings, in which.

DETAILED DESCRIPTION OF THE PREFERRED EMBODIMENTS

Figure 1:
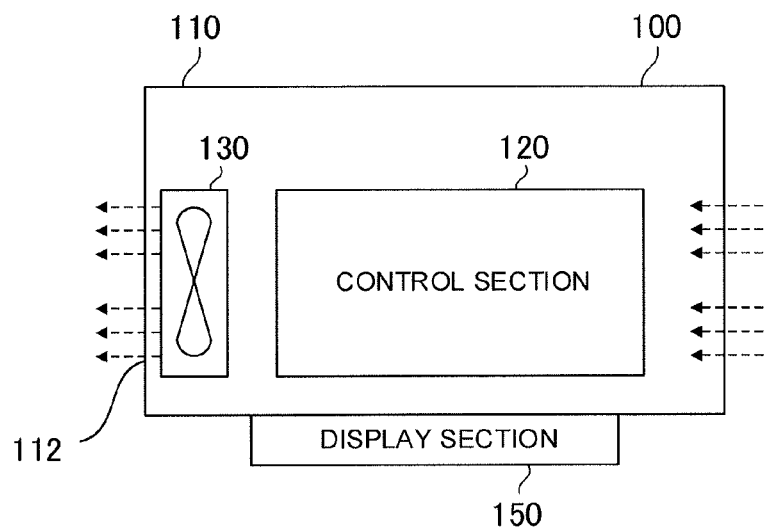
FIG. 1 is a schematic diagram showing one embodiment of an electronic apparatus with a fan motor according to the present invention.

FIG. 1 is a schematic diagram showing one embodiment of an electronic apparatus with a fan motor according to the present invention.

A control section 120 and a fan motor 130 are arranged in a housing 110 of an electronic apparatus 100. The housing 110 is provided with vent holes 112. Further, the fan motor 130 is disposed in the vicinity of the vent holes 112 in the housing 110 and has the function of discharging air from the housing 110 through the vent holes 112. The function of the control section 120 will be described later. Furthermore, a display section 150 is disposed outside the housing 110.

Figure 2:
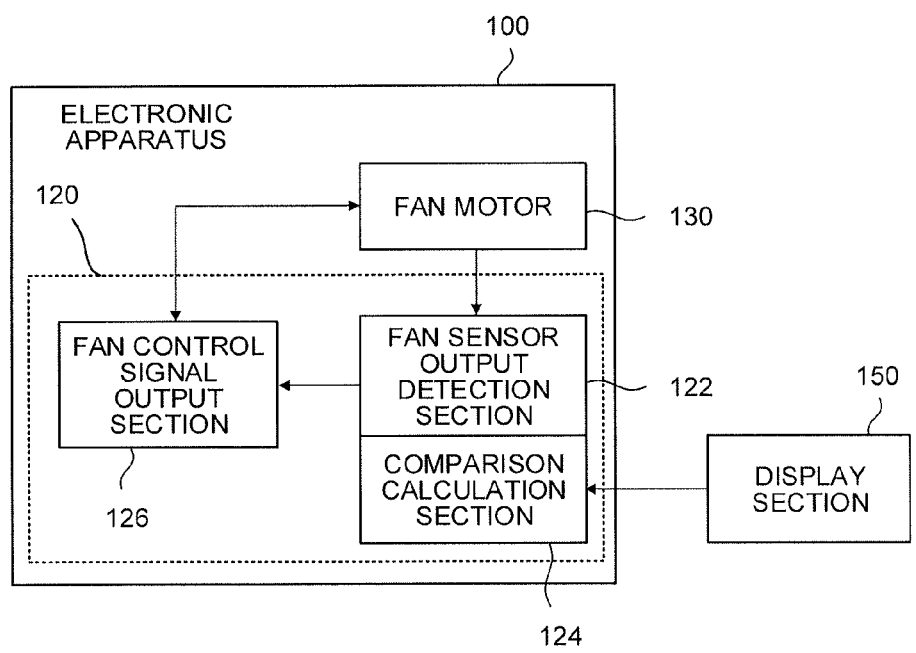
FIG. 2 is a system diagram of the electronic apparatus of FIG. 1.

FIG. 2 is a system diagram of the electronic apparatus 100 of FIG. 1.

As also shown in FIG. 1, the control section 120 and the fan motor 130 are arranged in the electronic apparatus 100. The control section 120 comprises a fan sensor output detection section 122, comparison calculation section 124, and fan control signal output section 126. The fan sensor output detection section 122 detects the operation state of the fan motor 130. The comparison calculation section 124 performs calculation for fan control based on the detection result of the fan sensor output detection section 122. A specific calculation method used by the comparison calculation section 124 will be described later.

Further, a detection output signal from the fan sensor output detection section 122 is input to the fan control signal output section 126, and moreover, a signal for fan motor control is output from the fan control signal output section 126 to the fan motor 130. Furthermore, the comparison calculation section 124 delivers the output (calculation result for fan control) as required to the display section 150, which displays necessary items.

Figure 3:
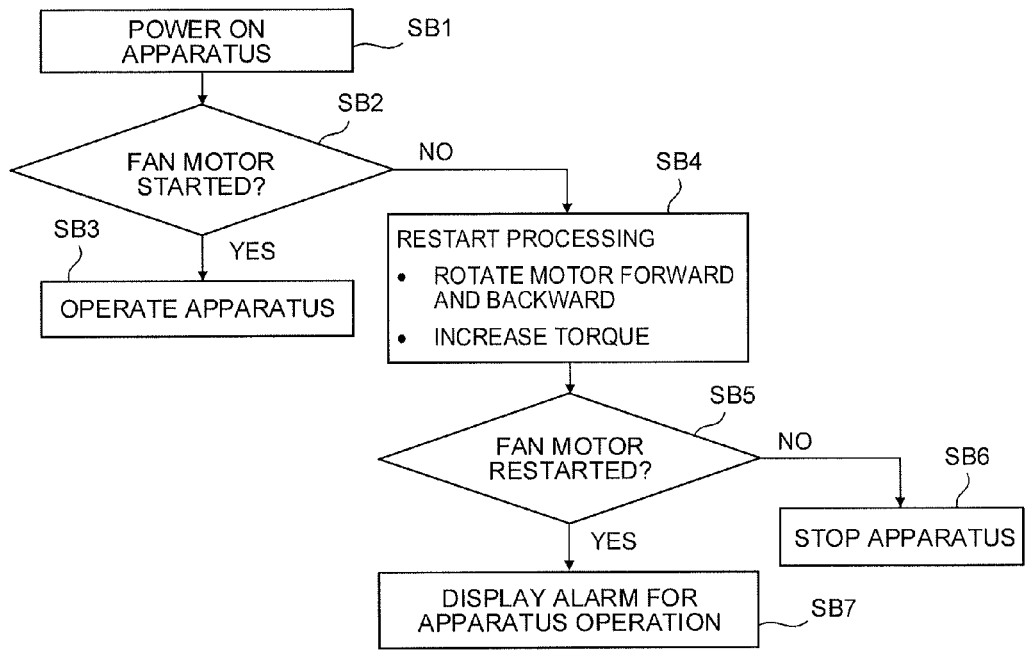
FIG. 3 is a flowchart showing a flow of processing (first example) for the determination of the degree of deterioration of the fan motor to be performed by the electronic apparatus of FIG. 2.

A first example of a flow of processing for the determination of the degree of deterioration of the fan motor to be performed by the electronic apparatus of FIG. 2 will first be described with reference to the flowchart of FIG. 3. The following is a sequential description of steps of the processing shown in this flowchart.

(Step SB1) The electronic apparatus is powered on.

(Step SB2) It is determined whether or not the fan motor in a stopped state rotates when it is powered on in Step SB1. If the motor rotates, the processing proceeds to Step SB3. If the motor remains stopped, the processing proceeds to Step SB4.

(Step SB3) The electronic apparatus is operated.

(Step SB4) The fan motor is rotated forward and backward or its torque is increased, whereby the motor is restarted.

(Step SB5) It is determined whether or not the fan motor rotates as a result of the restart processing of Step SB4. If the motor rotates, the processing proceeds to Step SB7. If the motor remains stopped, the processing proceeds to Step SB6.

(Step SB6) The fan motor is determined to be defective and the operation of the electronic apparatus is stopped.

(Step SB7) While the operation of the electronic apparatus is continued, an indication to prompt replacement of the fan motor is displayed due to the occurrence of deterioration.

Figure 4:
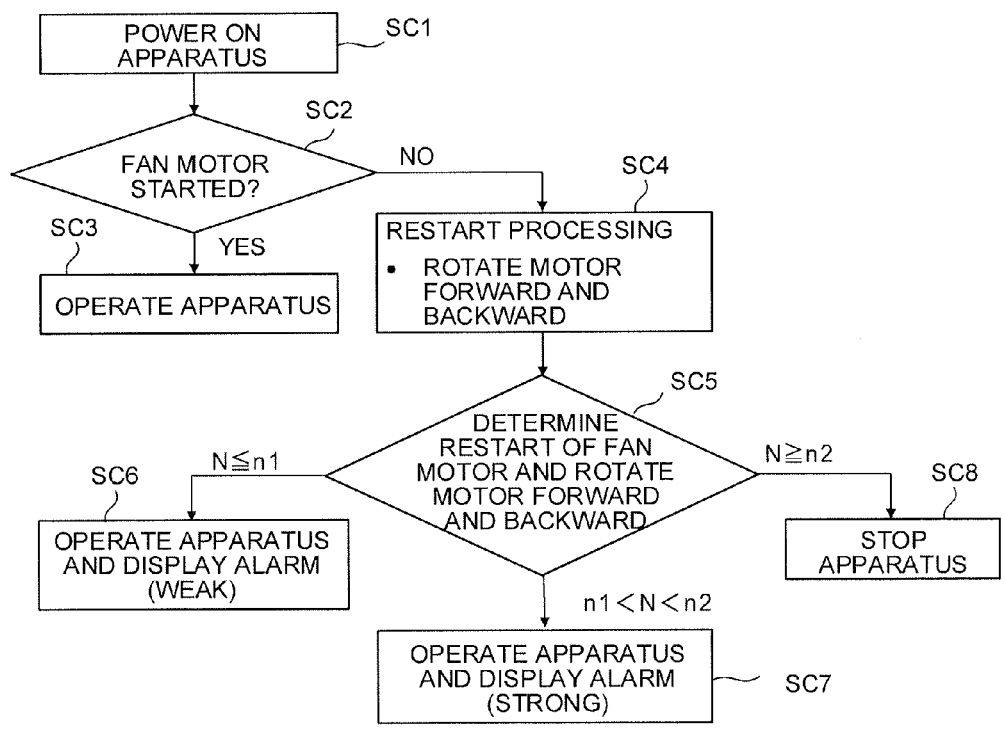
FIG. 4 is a flowchart showing a flow of processing (second example) for the determination of the degree of deterioration of the fan motor to be performed by the electronic apparatus of FIG. 2.

A second example of a flow of processing for the determination of the degree of deterioration of the fan motor to be performed by the electronic apparatus of FIG. 2 will now be described with reference to the flowchart of FIG. 4. In this processing, the fan motor is rotated forward and backward a plurality of times to be restarted. The following is a sequential description of steps of the processing shown in this flowchart.

(Step SC1) The electronic apparatus is powered on.

(Step SC2) It is determined whether or not the fan motor in a stopped state rotates when it is powered on in Step SC1. If the motor rotates, the processing proceeds to Step SC3. If the motor remains stopped, the processing proceeds to Step SC4.

(Step SC3) The electronic apparatus is operated.

(Step SC4) The fan motor is rotated forward and backward to be restarted.

(Step SC5) A repeat count N of the forward-backward rotation of the fan motor before the motor rotates after the restart processing in Step SC4 is measured. In doing this, n1 and n2 (n1<n2) are set in advance as counts that serve as evaluation criteria.

If the fan motor rotates after its forward-backward rotation is repeated a number of times not more than n1 (≥N), the processing proceeds to Step SC6. If the fan motor rotates after its forward-backward rotation is repeated a number of times more than n1 and less than n2 (n1<N<n2), the processing proceeds to Step SC7. If the fan motor rotates after its forward-backward rotation is repeated a number of times not less than n2 (≤N), moreover, the processing proceeds to Step SC8.

(Step SC6) The fan motor is determined to be slightly deteriorated and an alarm is displayed indicating that the motor is slightly deteriorated without interrupting the operation of the electronic apparatus.

(Step SC7) The fan motor is determined to be moderately deteriorated and an alarm is displayed indicating that the motor is moderately deteriorated without interrupting the operation of the electronic apparatus.

(Step SC8) The fan motor is determined to be defective and the operation of the electronic apparatus is stopped.

Figure 5:
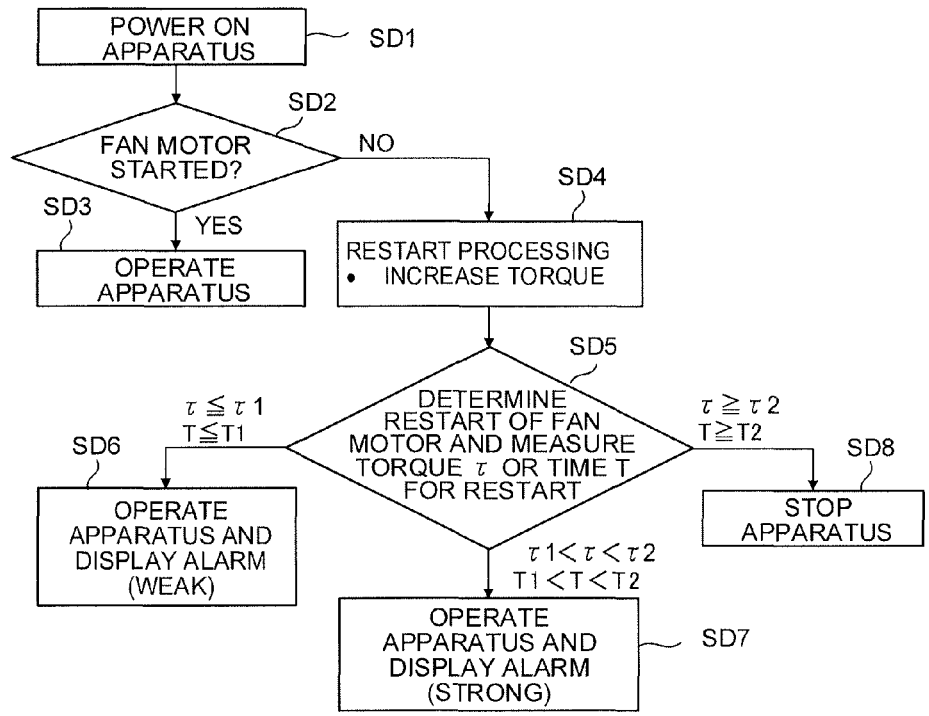
FIG. 5 is a flowchart showing a flow of processing (third example) for the determination of the degree of deterioration of the fan motor to be performed by the electronic apparatus of FIG. 2.
Figure 6:
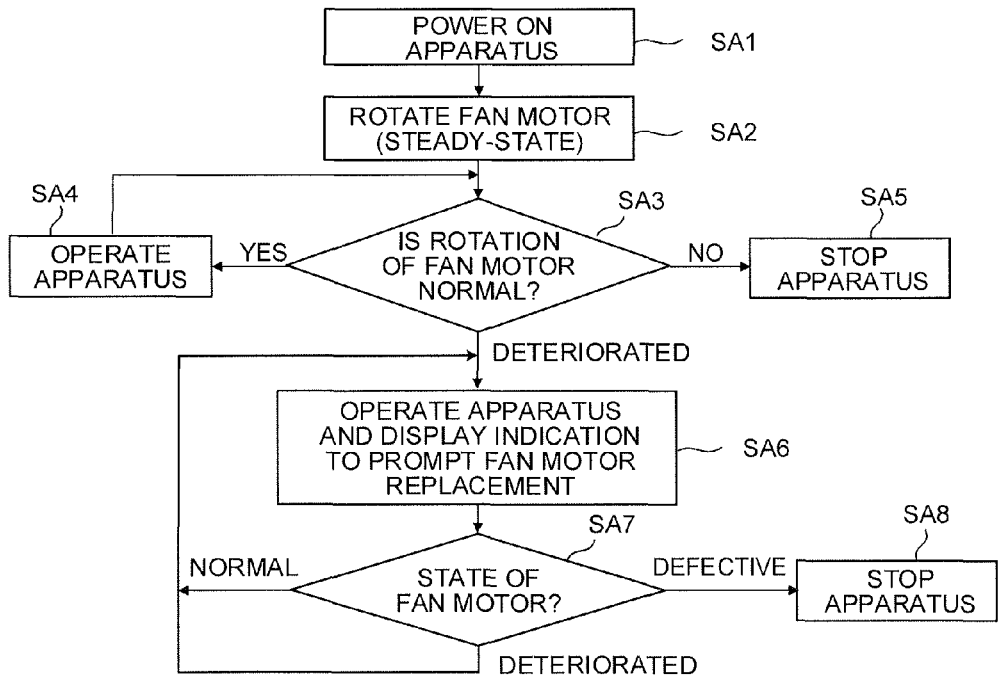
FIG. 6 is a flowchart showing a flow of processing for the determination of the degree of deterioration of a fan motor to be performed by a prior art electronic apparatus.

A third example of a flow of processing for the determination of the degree of deterioration of the fan motor to be performed by the electronic apparatus of FIG. 2 will now be described with reference to the flowchart of FIG. 5. In this processing, the torque of the fan motor is increased instead of rotating the motor forward and backward a plurality of times to restart it (as in the second example). The following is a sequential description of steps of the processing shown in this flowchart.

(Step SD1) The electronic apparatus is powered on.

(Step SD2) It is determined whether or not the fan motor in a stopped state rotates when it is powered on in Step SD1. If the motor rotates, the processing proceeds to Step SD3. If the motor remains stopped, the processing proceeds to Step SD4.

(Step SD3) The electronic apparatus is operated.

(Step SD4) The torque of the fan motor is increased so that the motor is restarted.

(Step SD5) The value of the torque for the restart of the fan motor or the time required for the restart of the motor after the restart processing in Step SD4 is measured. In doing this, torques τ1 and τ2 (τ1<τ1) or times τ1 and τ2 (τ1<τ2) are set in advance as torques or times that serve as evaluation criteria.

If the fan motor rotates with its torque τ not more than τ1 (or with its restart time T not more than T1) (τ≤τ1, T≤T1), the processing proceeds to Step SD6. If the fan motor rotates with its torque τ more than τ1 and less than τ2 (or with its restart time T more than T1 and less than T2) (τ1<τ≤τ2, T1<T<T2), the processing proceeds to Step SD7. If the fan motor rotates with its torque T not less than τ2 (or with its restart time T not less than T2) (τ≥τ2, T≥T2), the processing proceeds to Step SD8.

(Step SD6) The fan motor is determined to be slightly deteriorated and an alarm is displayed indicating that the motor is slightly deteriorated without interrupting the operation of the electronic apparatus.

(Step SD7) The fan motor is determined to be moderately deteriorated and an alarm is displayed indicating that the motor is moderately deteriorated without interrupting the operation of the electronic apparatus.

(Step SD8) The fan motor is determined to be defective and the operation of the electronic apparatus is stopped.

As described above with reference to the flowcharts of FIGS. 3 to 5, by restarting the motors in an extraordinary behavior in case of start failure of the motors in the stopped state, the lives of those fan motors which used to be normally determined to be defective despite their natural life expectancy can be prolonged, and further, preventive maintenance of the fan motor can be carried out by detecting the restoration of the operation of the fan motor which would not operate by an ordinary start-up, as deterioration of the fan motor. Further, the influences of environmental factors, such as a low temperature, clogging, etc., can be evaluated by monitoring the state at the time of restart. By determining the degree of deterioration of each fan motor, the operation of the motor can be continued to the end of its natural life, and a respite allowed for replacement of the motor can be known.

In connection with the embodiment of the present invention, the forward-backward rotation and torque increase have been described as examples of operation at the restart of the fan motor. Alternatively, however, the torque may be increased as the motor is rotated forward and backward as the operation at the restart, or the operation may be performed in an extraordinary behavior.

In the processing for the determination of the degree of deterioration of the fan motor described with reference to the flowchart of FIG. 5, the torque or the time required for the restart of the motor is used as the evaluation criteria when the torque is increased as the operation at the restart. Alternatively, also in this case, some other parameters may be used for the determination of the operation state of the fan motor.

The invention claimed is:

1. An electronic apparatus comprising:
   a fan motor;
   a rotation state detection unit configured to detect a rotation state of the fan motor;
   a display unit configured to display an operation state of the fan motor; and
   a restart control unit configured to restart the fan motor if a rotation failure of the fan motor in a stopped state is detected by the rotation state detection unit, wherein
   the display unit is configured to display an indication to prompt replacement of the fan motor if a normal operation of the fan motor is detected by the rotation state detection unit when the fan motor is restarted by the restart control unit, and
   the electronic apparatus is configured so that the electronic apparatus is stopped or the fan motor is de-energized if an abnormal operation of the fan motor is detected by the rotation state detection unit when the fan motor is restarted by the restart control unit.

2. The electronic apparatus according to claim 1, wherein the fan motor comprises therein the rotation state detection unit and the restart control unit.

3. The electronic apparatus according to claim 2, wherein the restart control unit is configured to operate the fan motor in a behavior different from that for the case of normal start when the fan motor is restarted.

4. The electronic apparatus according to claim 1, wherein the display unit is configured to display an indication to the effect that the fan motor is defective if an abnormal operation of the fan motor is detected by the rotation state detection unit when the fan motor is restarted by the restart control unit.

5. The electronic apparatus according to claim 4, wherein the restart control unit is configured to operate the fan motor in a behavior different from that for the case of normal start when the fan motor is restarted.

6. The electronic apparatus according to claim 1, wherein the restart control unit is configured to operate the fan motor in a behavior different from that for the case of normal start when the fan motor is restarted.

7. The electronic apparatus according to claim 6, wherein the fan motor is a reversible motor configured to repeat forward and backward rotations when restarted by the restart control unit, the electronic apparatus further comprises a deterioration level determination unit configured to determine a deterioration level based on the frequency of forward and backward rotations of the fan motor, and the display unit displays a message corresponding to the deterioration level determined by the deterioration level determination unit.

8. The electronic apparatus according to claim 6, wherein
the fan motor is configured so that the torque thereof is variable whereby the torque is increased when the fan motor is restarted by the restart control unit,
the electronic apparatus further comprises a deterioration level determination unit configured to determine a deterioration level based on the value of torque obtained when the fan motor is restarted or the time required for the restart, and
the display unit displays a message corresponding to the deterioration level determined by the deterioration level determination unit.

* * * * *